US005898986A

United States Patent [19]

Polidori et al.

[11] Patent Number: 5,898,986

[45] Date of Patent: May 4, 1999

[54] METHOD AND APPARATUS FOR SCREWING A NUT ONTO A STUD

[75] Inventors: Anthony Polidori, Stoney Creek; Kevin B. Gora, Wellandport, both of Canada

[73] Assignee: TRW Canada Ltd., St. Catharines, Canada

[21] Appl. No.: 08/966,920

[22] Filed: Nov. 10, 1997

[51] Int. Cl.[6] .................... B23Q 17/00

[52] U.S. Cl. .................... 29/407.04; 29/407.02; 29/407.01; 29/707; 29/714

[58] Field of Search .................... 29/407.02, 407.04, 29/407.1, 707, 714

[56] References Cited

U.S. PATENT DOCUMENTS

| | | | |
|---|---|---|---|
| 3,712,750 | 1/1973 | Healy | 408/3 |
| 3,765,075 | 10/1973 | Olney, Jr. et al. | 29/203 B |
| 3,799,680 | 3/1974 | Weisner | 356/225 |
| 3,856,414 | 12/1974 | Menary | 356/200 |
| 5,590,456 | 1/1997 | Armington et al. | 29/721 |

*Primary Examiner*—Joseph J. Hail, III
*Assistant Examiner*—William Hong
*Attorney, Agent, or Firm*—Tarolli, Sundheim, Covell, Tummino & Szabo

[57] ABSTRACT

To align an aperture (16) in a nut (12) with a hole (18) in a threaded stud (14), the nut (12) is rotated on the stud (14) to move the aperture (16) over the hole (18). Light is projected into the aperture (16) as the aperture (16) approaches the hole (18). The light is sensed when it projects from the aperture (16) through the hole (18) upon movement of the aperture (16) into alignment with the hole (18). Rotation of the nut (12) is stopped in response to sensing of the light.

6 Claims, 2 Drawing Sheets

METHOD AND APPARATUS FOR SCREWING A NUT ONTO A STUD

FIELD OF THE INVENTION

The present invention relates to a joint in which a nut is screwed onto a stud. The present invention particularly relates to a method and apparatus for screwing the nut onto the stud.

BACKGROUND OF THE INVENTION

A ball joint in a vehicle steering linkage may include a castellated nut and a threaded stud with a diametrically extending hole. The nut is screwed onto the stud to a position in which a pair of opposed castellation notches in the nut are aligned with the hole in the stud. A fastener, such as cotter pin, is inserted through the hole and the aligned notches to fasten the nut to the stud.

When a nut is fastened to the stud of a ball joint in the foregoing manner, it connects components of the vehicle steering linkage. Accordingly, the installer must tighten the nut against the linkage component at a specified level of torque and advance the nut to align a pair of castellation notches with the hole in the stud. This can be a difficult and time-consuming procedure.

SUMMARY OF THE INVENTION

The present invention comprises a method and apparatus for aligning an aperture in a nut with a hole in a threaded stud. In accordance with the invention, the nut is rotated on the stud to move the aperture over the hole. Light is projected into the aperture as the aperture approaches the hole. The light is sensed when it projects from the aperture through the hole upon movement of the aperture into alignment with the hole. Rotation of the nut is stopped in response to sensing of the light.

In accordance with a particular feature of the present invention, the light is sensed when the aperture is moved partially into alignment with the hole. Rotation of the nut is stopped when the nut has been rotated a slight, predetermined amount after the light is sensed. The aperture is thus moved more fully into alignment with the hole to provide a clear path for insertion of a fastener through the aperture and the hole.

BRIEF DESCRIPTION OF THE DRAWINGS

The foregoing and other features of the present invention will become apparent to one skilled in the art upon reading the following description with reference to the accompanying drawings wherein.

DESCRIPTION OF A PREFERRED EMBODIMENT OF THE INVENTION

Figure 1:
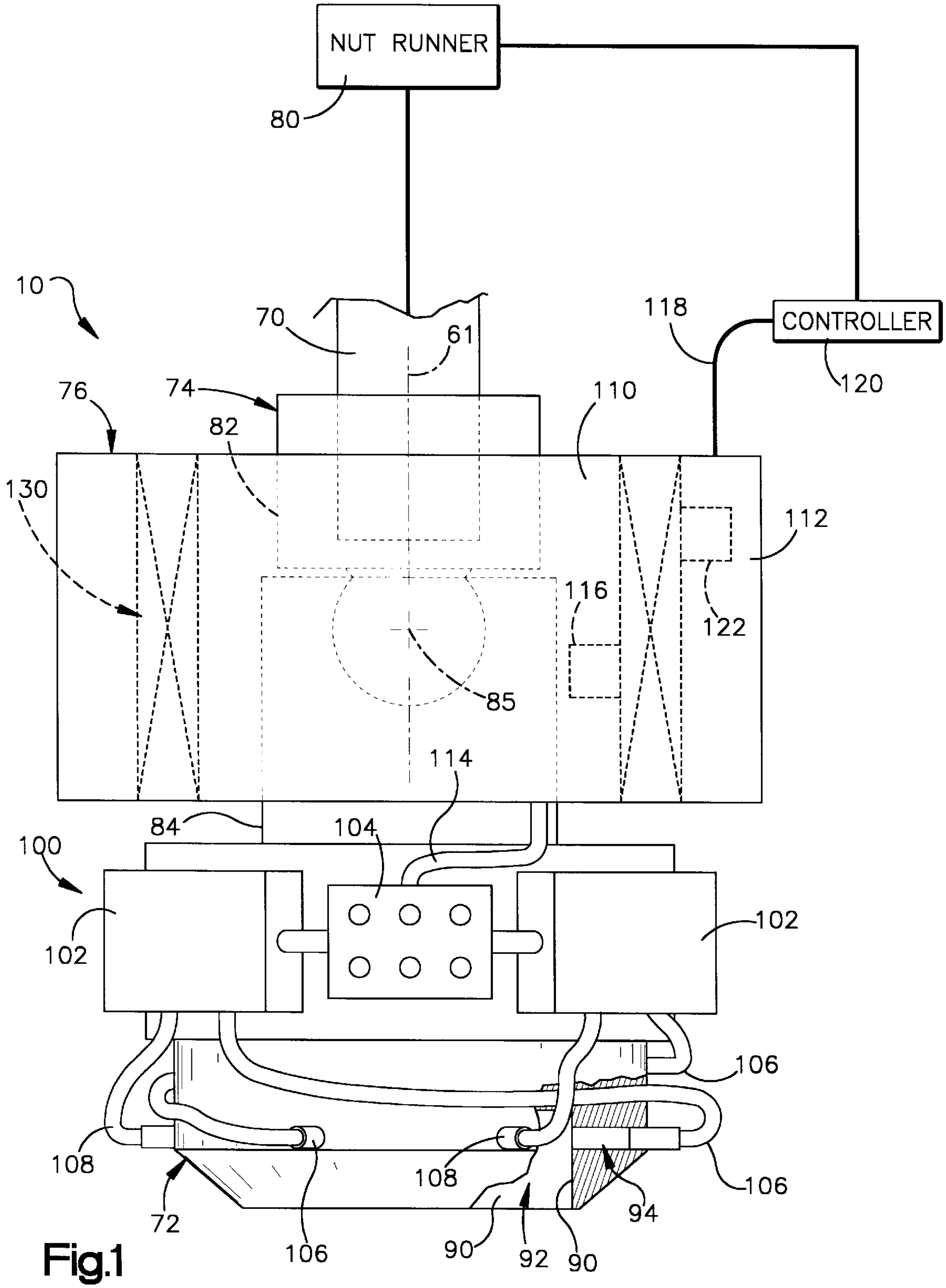
FIG. 1 is a partially schematic view of an apparatus comprising a preferred embodiment of the present invention.
Figure 2:
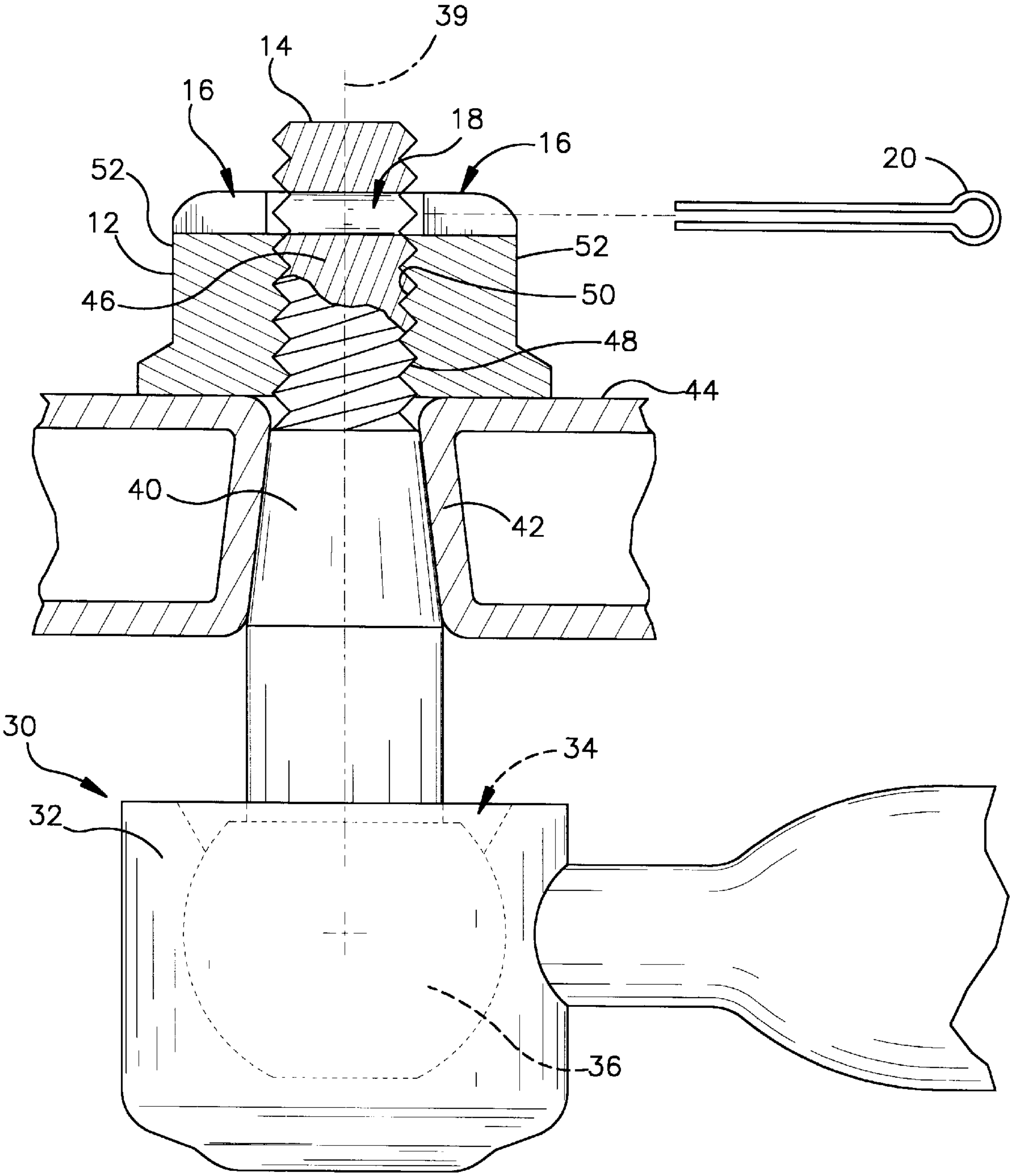
FIG. 2 is a partial view of an apparatus including a nut which has been screwed onto a stud in accordance with the present invention.

An apparatus 10 comprising a preferred embodiment of the present invention is shown partially in FIG. 1. The apparatus 10 is used in accordance with the invention to align an aperture in a nut with a hole in a threaded stud. For example, FIG. 2 shows a nut 12 on a threaded stud 14. The nut 12 has a plurality of apertures in the form of castellation notches 16. The stud 14 has a hole 18. The apparatus 10 of FIG. 1 screws the nut 12 onto the stud 14 to a position in which a pair of opposed notches 16 are aligned with the hole 18. The hole 18 and the aligned notches 16 define a clear path for insertion of a fastener, such as a cotter pin 20, through the nut 12 and the stud 14.

As shown in FIG. 2, the stud 14 is part of a ball joint 30. The ball joint 30 includes a housing 32 in addition to the stud 14. The housing 32 defines a socket 34 in which a ball end 36 of the stud 14 is supported for pivotal movement. The stud 14 projects longitudinally from the ball end 36 along an axis 39. A tapered intermediate portion 40 of the stud 14 extends through a mating portion 42 of a vehicle part 44. The vehicle part 44 may comprise, for example, a centerlink in a steering linkage. An end portion 46 of the stud 14 has an external screw thread 48 centered on the axis 39. The hole 18 extends diametrically through the end portion 46 of the stud 14.

The nut 12 has an internal screw thread 50 engaging the external screw thread 48 on the stud 14. Although the present invention is applicable to nuts of different shapes, the nut 12 shown in FIG. 2 is hexagonal, and has a castellation notch 16 extending radially inward from each of six planar side surfaces 52.

Referring again to FIG. 1, the apparatus 10 includes a plurality of parts that are centered on an axis 61 of rotation. These parts include a drive shaft 70, a socket 72, and a universal joint 74 connecting the drive shaft 70 with the socket 72. These parts further include a slip ring 76 which surrounds the universal joint 74 between the drive shaft 70 and the socket 72.

The drive shaft 70 comprises, or is linked with, the output shaft of a nut runner 80 (shown schematically). The nut runner 80 preferably comprises an Atlas Copco electric nut runner, but may alternatively comprise any other suitable apparatus known in the art.

An upper portion 82 of the universal joint 74 is fixed to the drive shaft 70. A lower portion 84 of the universal joint 74 is pivotal about a transverse axis 85 relative to the upper portion 82, and is fixed to the socket 72. In this manner, the universal joint 74 connects the socket 72 both rotatably and pivotally with the drive shaft 70.

The socket 72 has six planar inner surfaces 90, two of which are shown partially in FIG. 1. The inner surfaces 90 define the periphery of a hexagonal cavity 92 for receiving the nut 12 (FIG. 2). Six passages 94, one of which is shown in FIG. 1, extend radially through the socket 72. Each passage 94 extends radially outward from the middle of a corresponding inner surface 90, and is thus located directly opposite another passage 94 at an opposite side of the cavity 92. The locations of the passages 94 at the six sides of the cavity 92 correspond with the locations of the notches 16 at the six sides of the nut 12.

An optical sensor assembly 100 is mounted on the socket 72. The optical sensor assembly 100 includes three photoelectric sensor devices 102 (two of which are shown in FIG. 1) and a terminal block 104. Each sensor device 102 has a fiber optic transmitter 106 for projecting light inward through one of the passages 94. Each sensor device 102 further has a fiber optic receiver 108 for receiving light at an opposed passage 94. Such optical devices are well known, and are interconnected through the terminal block 104 in a known manner.

The slip ring 76, which is shown schematically in FIG. 1, is a known device for providing an electrical connection between relatively rotating parts. The slip ring 76 thus includes an inner ring 110 and an outer ring 112. The inner ring 110 is fixed to the upper portion 82 of the universal joint 74. A conduit 114 extends from the terminal block 104 to the inner ring 110. The conduit 114 contains electrical wires which connect the terminal block 104 to a terminal 116 on the inner ring 110. Another conduit 118 extends from a controller 120 (shown schematically) to the outer ring 112. The other conduit 118 contains electrical wires which connect the controller 120 to a terminal 122 on the outer ring 112.

A bearing 130 in the slip ring 76 enables the inner ring 110 to rotate about the axis 61 within the outer ring 112. The slip ring 76 conducts electrical signals between the terminals 116 and 122 on the inner and outer rings 110 and 112. In this manner, the slip ring 76 enables the optical sensor assembly 100, which rotates about the axis 61 with the socket 72 and the drive shaft 70, to communicate electrically with the controller 120.

The nut 12 is initially screwed manually onto the end portion 46 of the stud 14 to a position in which it is spaced from the vehicle part 44 along the axis 39, or to a position in which it loosely adjoins the vehicle part 44. Next, the nut 12 and the end portion 46 of the stud 14 are received coaxially within the cavity 92 in the socket 72. Each inner surface 90 of the socket 72 mates with a corresponding side surface 52 of the nut 12. Each passage 94 in the socket 72 is aligned circumferentially and axially with a corresponding notch 16 in the nut 12. Beams of light are then projected from the transmitters 106 into the corresponding passages 94 in the socket 72, and from those passages 94 into the corresponding notches 16 in the nut 12.

The operator of the apparatus 10 actuates the nut runner 80 so as to screw the nut 12 farther onto the stud 14 toward the final position of FIG. 2. As the nut 12 moves against the vehicle part 44, it presses the tapered portion 42 of the vehicle part 44 tightly over the tapered portion 40 of the stud 14. This increases the torque required to continue rotating the nut 12. The nut runner 80 measures the torque, and continues to rotate the nut 12 as the torque increases toward a specified level.

The controller 120, which may comprise a microprocessor of known construction, responds to the nut runner 80. Specifically, the controller 120 directs the nut runner 80 to reduce the rotational speed of the nut 12 when the torque reaches a preliminary level which is somewhat less than the specified level. This occurs when the nut 12 is spaced a short distance from the final position of FIG. 2. The specified level of torque for the nut 12 is preferably about 70 Nm, with the preliminary level preferably being about 50 Nm. The controller 120 further responds to the nut runner 80 by processing electrical outputs from the optical sensor assembly 100 when the torque reaches the preliminary level.

As the nut 12 continues to rotate slowly toward the final position of FIG. 2, a pair of opposed notches 16 approach the opposite ends of the hole 18 and begin to move partially into alignment with the hole 18. The hole 18 and the partially aligned notches 16 define a clear path for a beam of light to be projected across the cavity 92 from the passage 94 at one of the partially aligned notches 16 to the opposed passage 94 at the other partially aligned notch 16. A beam of light is thus projected from a transmitter 106 to a receiver 108. The corresponding sensor device 102 senses the projected beam of light, and responds by providing the controller 120 with an electrical output in the form of a first alignment signal.

The controller 120 does not direct the nut runner 80 to stop rotating the nut 12 upon receiving the first alignment signal. Instead, the controller 120 directs the nut runner 80 to continue rotating the nut 12 so that the torque will further increase toward the specified level. The optical sensor assembly 100 then provides a second alignment signal upon movement of a second pair of notches 16 partially into alignment with the hole 18. The controller 120 responds to the second alignment signal by directing the nut runner 80 to rotate the nut 12 through a slight amount of additional rotation, and then to stop rotating the nut 12. This limited amount of additional rotation is a predetermined amount which moves the partially aligned notches 16 more fully into alignment with the hole 18 to define a clear path for insertion of the fastener 20. Next, the apparatus 10 and the ball joint 30 are separated from each other, and the fastener 20 is inserted to fasten the nut 12 to the stud 14.

From the above description of the invention, those skilled in the art will perceive improvements, changes and modifications. Such improvements, changes and modifications within the skill of the art are intended to be covered by the appended claims.

Having described the invention, the following is claimed:

1. A method of aligning an aperture in a nut with a hole in a threaded stud, said method comprising the steps of:

rotating the nut on the stud to move the aperture over the hole;

projecting light into the aperture as the aperture approaches the hole;

sensing said light when said light projects from the aperture through the hole upon movement of the aperture into alignment with the hole; and terminating said rotating step in response to said sensing step.

2. A method as defined in claim 1 wherein terminating step being performed when the nut has been rotated a predetermined amount after said light is sensed, whereby the aperture is moved more fully into alignment with the hole to provide a clear path for insertion of a fastener through the aperture and the hole.

3. A method as defined in claim 1 further comprising the step of measuring torque required to rotate the nut on the stud, said terminating step being performed in response to said sensing step after said measured torque reaches a predetermined level.

4. Apparatus for aligning an aperture in a nut with a hole in a threaded stud, said apparatus comprising:

means for rotating the nut on the stud to move the aperture over the hole;

means for projecting light into the aperture as the aperture approaches the hole;

means for sensing said light when said light projects from the aperture through the hole upon movement of the aperture into alignment with the hole; and means for stopping rotation of the nut in response to said sensing of said light.

5. Apparatus as defined in claim 4 wherein said sensing means senses said light when the aperture is moved partially into alignment with the hole, said stopping means stopping rotation of the nut only when said rotating means has rotated the nut a predetermined amount after said light is sensed, whereby said stopping means enables said rotating means to move the aperture more fully into alignment with the hole to provide a clear path for insertion of a fastener through the aperture and the hole.

6. Apparatus as defined in claim 4 further comprising means for measuring torque required to rotate the nut on the stud, said stopping means stopping rotation of the nut in response to said sensing of said light after said measured torque reaches a predetermined level.

* * * * *